(12) United States Patent
Xue et al.

(10) Patent No.: US 9,155,034 B1
(45) Date of Patent: Oct. 6, 2015

(54) WIRELESS COMMUNICATION DEVICE AND METHOD FOR HAND-UP FROM LESS-CAPABLE TO MORE-CAPABLE COMMUNICATION PROTOCOL

(71) Applicant: Sprint Communications Company L.P., Overland Park, KS (US)

(72) Inventors: Wen Xue, Overland Park, KS (US); Krishna D. Sitaram, Chantilly, VA (US); Rajat Kumar, Woodridge, IL (US); Jay Douglas Cole, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 72 days.

(21) Appl. No.: 14/054,937

(22) Filed: Oct. 16, 2013

(51) Int. Cl.
*H04W 40/00* (2009.01)
*H04W 48/18* (2009.01)

(52) U.S. Cl.
CPC .................................... *H04W 48/18* (2013.01)

(58) Field of Classification Search
USPC ................................................. 455/436–448
See application file for complete search history.

(56) References Cited

U.S. PATENT DOCUMENTS

2012/0058760 A1   3/2012   Jang et al.
2012/0208540 A1   8/2012   Kim et al.

FOREIGN PATENT DOCUMENTS

| EP | 2392154 | 8/2010 |
| EP | 2438695 | 12/2010 |
| WO | 2010088086 | 8/2010 |
| WO | 2010141568 | 12/2010 |

*Primary Examiner* — Joel Ajayi

(57) ABSTRACT

A Wireless Communication Device (WCD) and method for hand-up from a less-capable communication protocol of a wireless access node to a more-capable communication protocol of the wireless access node are provided. The WCD in one example embodiment includes a communication transceiver configured to exchange wireless communications and receive a control signal from the wireless access node, with the control signal including a hand-up field, and a processing system coupled to the communication transceiver and configured to process the hand-up field to determine if the WCD can hand-up from the less-capable communication protocol to the more-capable communication protocol, set a hand-up state according to the hand-up field, and scan for the availability of the more-capable communication protocol if the more-capable communication protocol is indicated by the hand-up state.

10 Claims, 4 Drawing Sheets

WIRELESS COMMUNICATION DEVICE AND METHOD FOR HAND-UP FROM LESS-CAPABLE TO MORE-CAPABLE COMMUNICATION PROTOCOL

Wireless networks transfer large amounts of information, including voice, data, and signaling information. Wireless networks, such as cellular networks, are continually growing in size, capacity, and complexity.

Wireless networks are migrating from third generation (3G) cellular wireless networks to fourth generation (4G) wireless networks. As part of the migration, wireless network operators may deploy access networks of different technologies so that Wireless Communication Devices (WCDs, including cellular phones) can operate using various technologies. For example, WCDs can be handed off from a wireless access network of a first technology to a wireless access network of a second technology. Alternatively, WCDs can perform cell selection when starting up within wireless access networks of different technologies.

In some examples, a wireless network operator can operate both evolved High Rate Packet Data (eHRPD) wireless access networks and Long Term Evolution (LTE) wireless access networks. An eHRPD wireless access network is capable of interworking with a LTE wireless access network. As a result, a WCD configured for an eHRPD wireless access network can be handed-up to a LTE wireless access network.

It is a problem to provide newer and better wireless access networks, yet without dropping existing wireless access networks. People want their wireless devices to work equally well with older and newer wireless access networks and network protocols.

One aspect of wireless network evolution is that multiple wireless protocols may need to be supported. This includes supporting cellular phone systems that use an older, less-capable communication protocol, such as eHRPD wireless access networks, and also supporting newer networks, such as LTE wireless access networks. The LTE communication protocol is more efficient in the use of bandwidth. While LTE wireless access networks are preferred, not all wireless communication devices may be able to communicate over LTE networks. As a result, a wireless network provider may need to offer network service that supports both eHRPD and LTE, for example.

Where a WCD can use either eHRPD or LTE communication protocols, it is desired that the LTE capability be used by WCDs when possible. However, if the WCD first registers with an eHRPD wireless network, the WCD may need to later hand-up to a LTE wireless access network.

In the prior art, a WCD will attempt to hand-up by periodically scanning for a more-capable communication protocol. If a more-capable communication protocol does not exist, or is not available, the WCD can expend significant amounts of battery power by repeatedly and futilely scanning for a more-capable communication protocol. Some existing WCDs try to prevent needless battery drain by increasing the time between scans, by reducing the time (and electrical power) used for each scan, or both, in the belief that if a more-capable communication protocol is not immediately found, then it is more and more unlikely that a more-capable communication protocol will be found as time passes. In addition, if the WCD has only one radio transceiver element, then the WCD will not be able to perform regular phone functions and scan for a more-capable communication protocol at the same time.

Overview

A Wireless Communication Device (WCD) and method for hand-up from a less-capable communication protocol of a wireless access node to a more-capable communication protocol of the wireless access node are provided. The WCD in one example embodiment includes a communication transceiver configured to exchange wireless communications and receive a control signal from the wireless access node, with the control signal including a hand-up field, and a processing system coupled to the communication transceiver and configured to process the hand-up field to determine if the WCD can hand-up from the less-capable communication protocol to the more-capable communication protocol, set a hand-up state according to the hand-up field, and scan for the availability of the more-capable communication protocol if the more-capable communication protocol is indicated by the hand-up state.

DETAILED DESCRIPTION

Figure 1:
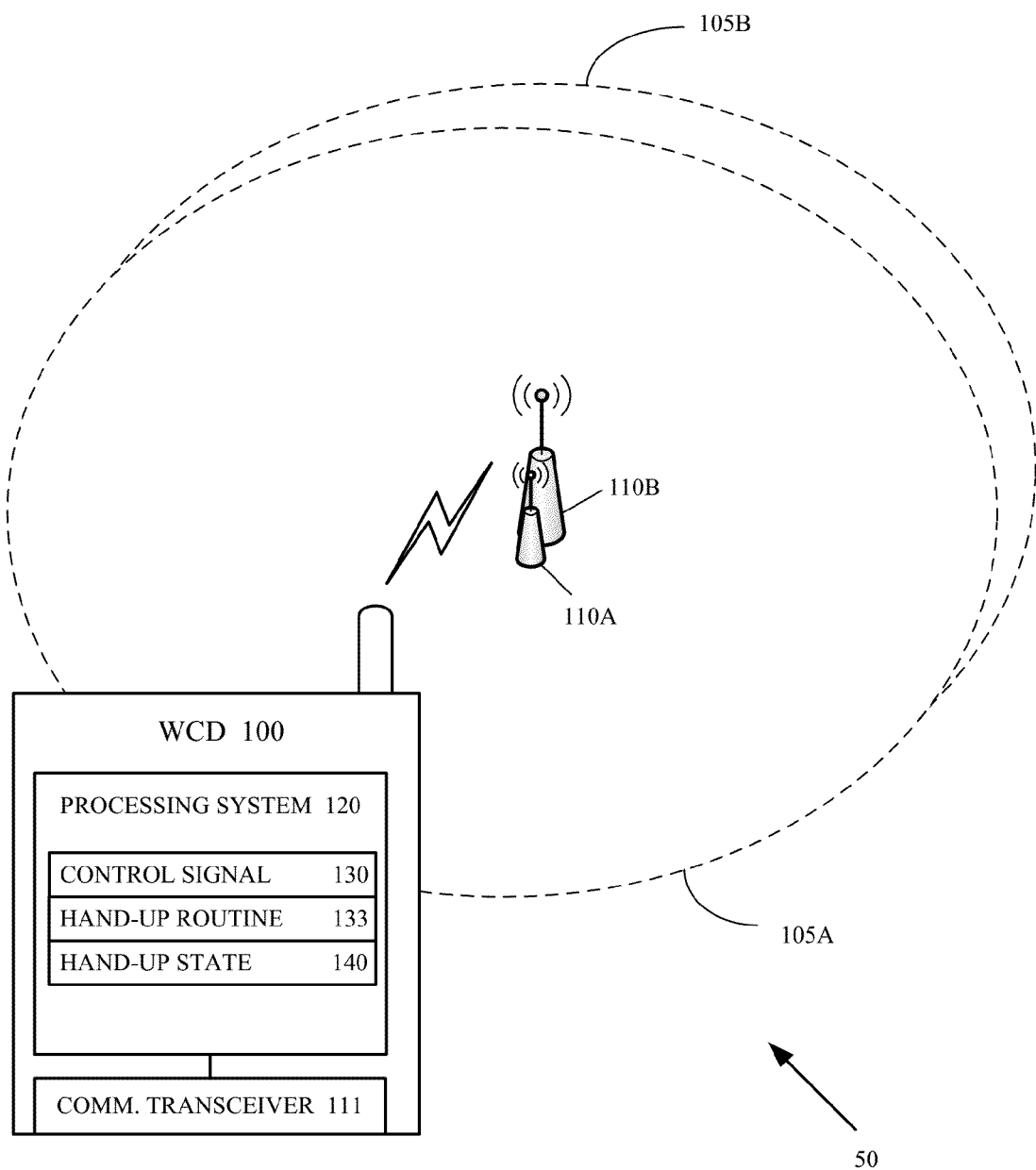
FIG. 1 shows an exemplary wireless communication environment.

FIG. 1 shows an exemplary wireless communication environment 50. The wireless communication environment 50 includes a wireless access node 110 having a wireless coverage area 105 (i.e., a cell 105). The term cell can refer to an entire cell, a cell sector, or any other segment of a cell. A wireless communication device (WCD) 100 is within the wireless coverage area 105. It should be understood that any number of WCDs 100 can be present within the wireless coverage area 105.

The wireless access node 110 is shown as two components 110A and 110B in the figure in order to denote that the wireless access node 110 operates using at least two communication protocols in the example. The wireless access node 110A operates using a less-capable communication protocol and the wireless access node 110B operates using a more-capable communication protocol in some examples. The wireless access node 110A operates using a third generation (3G) communication protocol and the wireless access node 110B operates using a fourth generation (4G) communication protocol in some examples. The wireless access node 110A operates using an evolved High Rate Packet Data (eHRPD) communication protocol and the wireless access node 110B operates using a Long Term Evolution (LTE) communication protocol in some examples. The LTE wireless access node 110B is additionally connected to other network components, including, for example, a serving gateway and a mobility management entity (MME), not shown. The eHRPD wireless access node 110A is additionally connected to an HRPD serving gateway (HSGW), not shown. Although just one LTE wireless access node 110B and one eHRPD wireless access node 110A are depicted in the figure, it is noted that typically there can be multiple LTE wireless access nodes and multiple eHRPD wireless access nodes in a given geographical region.

The physical infrastructure of the wireless access node 110 may comprise one component or system, may comprise two separate components or systems, or may comprise two separate systems with some shared components. Where the wireless access node 110A and the wireless access node 110B comprise at least some separate components and/or infrastructure in some examples, the wireless access node 110A and the wireless access node 110B are essentially co-located.

The wireless access node 110A generates a less-capable wireless coverage area 105A, while the wireless access node 110B generates a more-capable wireless coverage area 105B. The two coverage areas 105A and 105B may have a substantially same center. The two coverage areas 105A and 105B may have coverage areas of the same size or of different sizes. The two coverage areas 105A and 105B can partially or fully overlap.

In some examples, the WCD 100 can hand-up from the less-capable communication protocol provided by the wireless access node 110A to the more-capable communication protocol provided by the wireless access node 110B. The hand-up can be from a third generation (3G) cellular communication protocol to a fourth generation (4G) cellular communication protocol in some examples. The hand-up can be from an eHRPD communication protocol to a LTE communication protocol in some examples.

A WCD 100 that is in an eHRPD cell may be notified of neighboring LTE cells in some examples. When the WCD 100 is aware that LTE cell or cells are present, the WCD 100 may attempt to acquire the signaling of the neighboring LTE cell or cells and hand-up to a LTE cell instead of an eHRPD cell. For example, the WCD 100 can attempt to search for the pilot signal of the LTE cells and can determine if the WCD 100 can perform a hand-up to one of the LTE cells. Pilot signaling includes signaling that is continuously or substantially continuously transmitted by the wireless access node 110 to allow the WCD 100 to detect the wireless access node 110. Measurements made with respect to the pilot signaling allow the WCD 100 to determine whether or not the WCD 100 can establish a wireless connection with the wireless access node 110. Hand-up is a form of hand-off from a cell of a prior generation (e.g., third generation or 3G) to a cell of a higher generation (e.g., fourth generation or 4G) in some examples.

It is desired that the WCD 100 hand-up from the less-capable communication protocol to the more-capable communication protocol. However, in many cases the wireless communication environment 50 is not equipped to perform an automatic hand-up. Currently, the WCD 100 typically must discover on its own whether there is a possibility of a hand-up. If the WCD 100 is currently communicating with the wireless access node 110A using the less-capable communication protocol, the WCD 100 can scan for the more-capable communication protocol. However, if done at intervals, the scanning can drain the battery power of the WCD 100. Unless the wireless access node 110 is designed and constructed to broadcast a hand-up signal, then the WCD 100 has no way of knowing whether the wireless access node 110 features a more-capable communication protocol.

The WCD 100 in the example shown includes a communication transceiver 111 and a processing system 120 coupled to the communication transceiver 111. The communication transceiver 111 is configured to exchange wireless communications. The communication transceiver 111 is configured to receive a control signal 130 from the wireless access node 110, with the control signal 130 including a hand-up field 153. The communication transceiver 111 can also comprise a user interface, wherein the communication transceiver 111 can accept user inputs and generate outputs to the user.

The processing system 120 can comprise one or more microprocessors and other circuitry that retrieves and executes the hand-up routine 133. The processing system 120 stores variables, measurements, data, and other information needed to operate the WCD 100 or obtained during operation of the WCD 100. In some examples, the processing system 120 stores a control signal 130, a hand-up routine 133, and a hand-up state 140.

In some embodiments, the hand-up routine 133 when executed by the WCD 100 in general or the processing system 120 in particular operates to direct the WCD 100 or the processing system 120 to receive a control signal 130 from the wireless access node 110, with the control signal 130 including a hand-up field, process the hand-up field to determine if the WCD 100 can hand-up from a less-capable communication protocol to a more-capable communication protocol, set a hand-up state 140 according to the hand-up field, and scan for the availability of the more-capable communication protocol if the more-capable communication protocol is indicated by the hand-up state 140.

The hand-up routine 133 causes the WCD 100 to attempt a hand-up process, as is further discussed below. The hand-up routine 133 can receive and process the control signal 130. The hand-up routine 133 can store the contents of a received hand-up field in the hand-up state 140. The hand-up routine 133 can determine if the hand-up state 140 is TRUE or FALSE. The hand-up routine 133 can initiate a scan for the more-capable communication protocol if the hand-up state 140 is TRUE.

The hand-up state 140 comprises a copy of a hand-up field of the control signal 130. The hand-up state 140 can include an indication that a hand-up is available or possible. The hand-up state 140 indicates that the wireless access node includes more than one communication protocol. The hand-up state 140 indicates that the WCD 100 can hand-up from a current communication protocol to another available communication protocol. The hand-up state 140 indicates that the WCD 100 can hand-up from a less-capable, current communication protocol to a more-capable communication protocol in some examples. The hand-up state 140 indicates that the WCD 100 can hand-up from a third generation (3G) cellular communication protocol to a fourth generation (4G) cellular communication protocol in some examples. The hand-up state 140 indicates that the WCD 100 can hand-up from an eHRPD communication protocol to a LTE communication protocol in some examples.

In one example, the WCD 100 exchanges communications with the wireless access node 110A. The communications can include a control signal 130 that is received from the wireless access node 110A (see FIG. 4 and the accompanying discussion below). For example, the WCD 100 can receive the control signal 130 from the wireless access node 110A when the WCD 100 moves to the wireless access node 110A or moves between access nodes.

In some examples, the control signal 130 comprises a Vendor Specific Network Control Protocol (VSNCP) control signal 130. The hand-up field 153 in some examples comprises a user-defined field, wherein the hand-up field 153 can comprise a hand-up TRUE state or can comprise a hand-up FALSE state. However, any suitable control signal capable of communicating a hand-up indication to the WCD 100 can be employed.

The control signal 130 in the example includes a hand-up field 153. The hand-up field 153 indicates that the wireless access node 110B includes a more-capable communication protocol (i.e., the wireless access node 110A includes a less-capable communication protocol). The WCD 100, upon receiving the control signal 130, can scan for the more-capable communication protocol if the hand-up state 140 now comprises a hand-up TRUE state. The WCD 100 can scan for a predetermined scan time. The WCD 100 can scan for a pilot signal generated by the wireless access node 110B in some examples.

If the hand-up scan is successful, the WCD 100 can hand-up to the wireless access node 110B and the more-capable communication protocol. If the hand-up scan is not successful, then the WCD 100 can continue communicating with the wireless access node 110A and can continue using the less-capable communication protocol.

Figure 2:
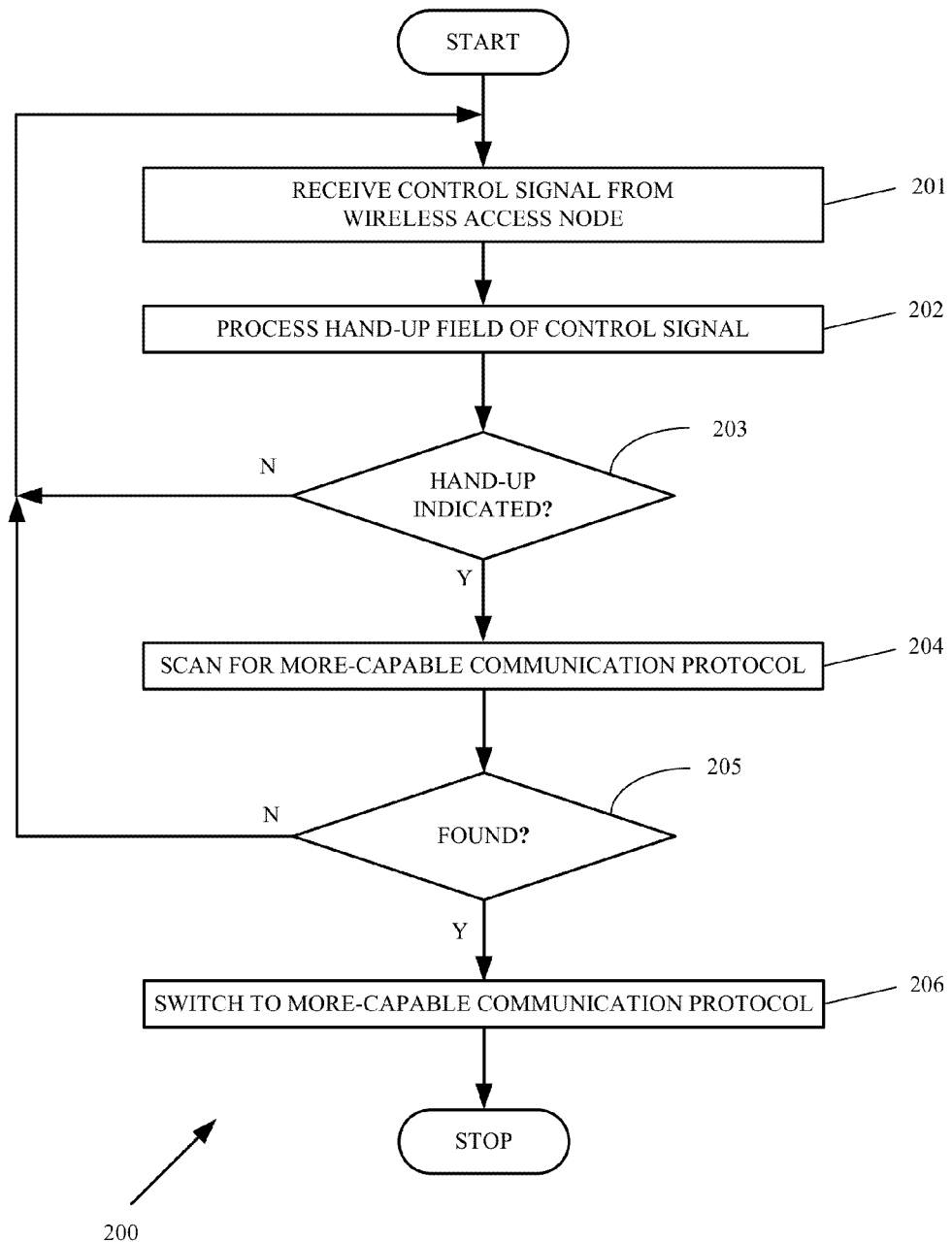
FIG. 2 is a flowchart of an exemplary hand-up method in the WCD.

FIG. 2 is a flowchart 200 of an exemplary hand-up method in the WCD. The hand-up is from a less-capable communication protocol of a wireless access node to a more-capable communication protocol of the wireless access node. In step 201, the WCD receives a control signal from a wireless access node. The control signal is received in response to the WCD entering a wireless coverage area of the wireless access node in some examples. The control signal is received in response to the more-capable communication protocol of the wireless access node becoming available in other examples. However, the control signal can be received in the WCD through other actions, such as a request by the WCD, a change in status or operation of the WCD, or other actions or events.

In step 202, the WCD processes a hand-up field included in the control signal. The hand-up field can include an indication that a hand-up is available or possible. The hand-up field indicates that the wireless access node features more than one communication protocol. The hand-up field indicates that the WCD can hand-up from a current communication protocol to another available communication protocol. The hand-up field indicates that the WCD can hand-up from a less-capable, current communication protocol to a more-capable communication protocol. The hand-up field indicates that the WCD can hand-up from a third generation (3G) cellular communication protocol to a fourth generation (4G) cellular communication protocol in some examples. The hand-up field indicates that the WCD can hand-up from an eHRPD communication protocol to a LTE communication protocol in some examples.

In step 203, if the hand-up field indicates that a hand-up is possible, then the method proceeds to step 204. Otherwise, the method branches back to step 201 and the WCD waits for an indication that a hand-up is possible.

In step 204, the WCD scans for a hand-up. The WCD can scan for a different communication protocol than a currently-used communication protocol. The WCD can scan for a more-capable communication protocol than the currently-used communication protocol.

The WCD can scan for a predetermined scan time period. The scan can comprise a scan for a pilot signal of the more-capable communication protocol, for example.

In step 205, if the more-capable communication protocol is found, then the method proceeds to step 206. Otherwise, the method branches back to step 201 and the WCD waits for another indication that a hand-up is possible.

In step 206, the WCD hands-up from a current communication protocol to another available communication protocol. The WCD can hand-up to a more-capable communication protocol. The WCD can hand-up from a third generation (3G) communication protocol to a fourth generation (4G) communication protocol. The WCD can hand-up from an eHRPD communication protocol to a LTE communication protocol. The WCD and the wireless access node can then continue to exchange communications.

Figure 3:
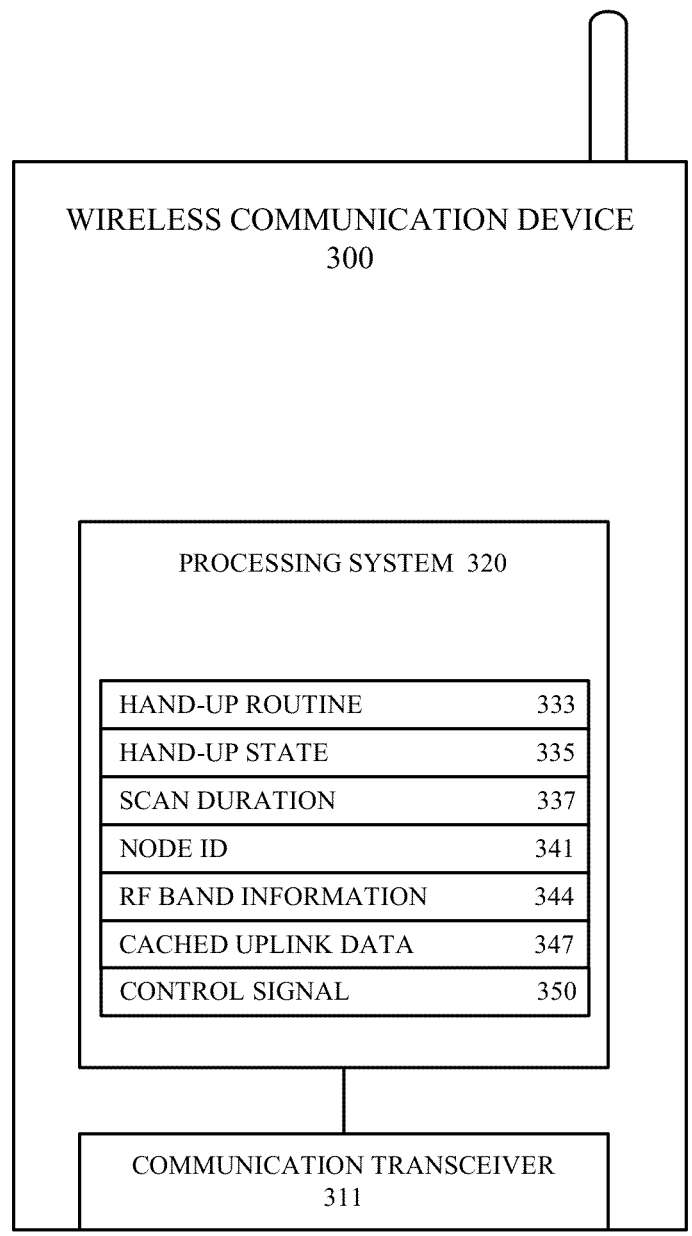
FIG. 3 shows an exemplary Wireless Communication Device (WCD).

FIG. 3 shows an exemplary WCD 300. The WCD 300 is an example of the WCD 100 of FIG. 1. The WCD 100 of FIG. 1 can be the same as, or different from, the WCD 300 of FIG. 3. The WCD 300 in the example shown includes a communication transceiver 311 and a processing system 320 coupled to the communication transceiver 311.

The communication transceiver 311 is configured to exchange wireless communications. The communication transceiver 311 is configured to receive a control signal 350 from the wireless access node 110, with the control signal 350 including a hand-up field 356. The control signal 350 is an example of the control signal 130 of FIG. 1. The control signal 130 of FIG. 1 can be the same as, or different from, the control signal 350 of FIG. 3. The communication transceiver 311 can also comprise a user interface, wherein the communication transceiver 311 can accept user inputs and generate outputs to the user.

The processing system 320 can comprise one or more microprocessors and other circuitry that retrieves and executes the hand-up routine 333. The processing system 320 stores variables, measurements, data, and other information needed to operate the WCD 300 or obtained during operation of the WCD 300. In some examples, the processing system 320 stores a control signal 350, a hand-up routine 333, a hand-up state 335, a scan duration 337, a node ID 341, a RF band information 344, and cached uplink data 347.

In some embodiments, the hand-up routine 333 when executed by the WCD 300 in general or the processing system 320 in particular operates to direct the WCD 300 or the processing system 320 to receive a control signal 350 from the wireless access node 110, with the control signal 350 including a hand-up field 356, process the hand-up field 356 to determine if the WCD 300 can hand-up from a less-capable communication protocol to a more-capable communication protocol, set a hand-up state 335 according to the hand-up field 356, and scan for the availability of the more-capable communication protocol if the more-capable communication protocol is indicated by the hand-up state 335.

The hand-up routine 333 causes the WCD 300 to attempt a hand-up process, as is further discussed below. The hand-up routine 333 can receive and process the control signal 350. The hand-up routine 333 can store the contents of the received hand-up field 356 of the control signal 350 in the hand-up state 335. The hand-up routine 333 can determine if the hand-up state 335 is TRUE or FALSE. The hand-up routine 333 can initiate a scan for the more-capable communication protocol if the hand-up state 335 is TRUE. The hand-up routine 333 can extract a received wireless access node ID and store the information in the node ID 341. The hand-up routine 333 can extract received RF band information from the control signal 350 and store the information in the RF band information 344.

The hand-up state 335 comprises a copy of the hand-up field 356 of the control signal 350. The hand-up state 335 can include an indication that a hand-up is available or possible. The hand-up state 335 indicates that the wireless access node includes more than one communication protocol. The hand-up state 335 indicates that the WCD 300 can hand-up from a current communication protocol to another available communication protocol. The hand-up state 335 indicates that the WCD 300 can hand-up from a less-capable, current communication protocol to a more-capable communication protocol in some examples. The hand-up state 335 indicates that the WCD 300 can hand-up from a third generation (3G) cellular communication protocol to a fourth generation (4G) cellular communication protocol in some examples. The hand-up state 335 indicates that the WCD 300 can hand-up from an eHRPD communication protocol to a LTE communication protocol in some examples.

The scan duration 337 comprises a predetermined scan duration time period. The scan duration 337 controls how long the WCD 300 will scan for the more-capable communication protocol. The scan duration 337 can be of any suitable time period. However, because the WDCD 200 scans when the hand-up field 356 is TRUE, then a long scan duration time period is not needed. If the WCD 300 scans only when the control signal 350 of the wireless access node 110 directs or signals the WCD 300 to scan, it is unlikely that the scan will fail.

The node ID 341 comprises an identifier of the wireless access node 110. The node ID 341 comprises information received in the control signal 350, for example. The node ID 341 may receive an identifier value whenever the WCD 300 first moves into the wireless coverage area 105 of the wireless access node 110.

The RF band information 344 comprises RF information corresponding to the more-capable communication protocol. The RF band information 344 comprises information that may be needed by the WCD 300 in the event of a hand-up. The RF band information 344 can facilitate and speed up a hand-up process.

The cached uplink data 347 comprises uplink data that is cached by the WCD 300 in the event the hand-up is not successfully completed. The cached uplink data 347 comprises data pertaining to the less-capable communication protocol. The cached uplink data 347 comprises data that may no longer be needed by the WCD 300. The cached uplink data 347 comprises data that is cached when the WCD 300 attempts a hand-up. The cached uplink data 347 may be recalled and used if a hand-up is unsuccessful.

Figure 4:
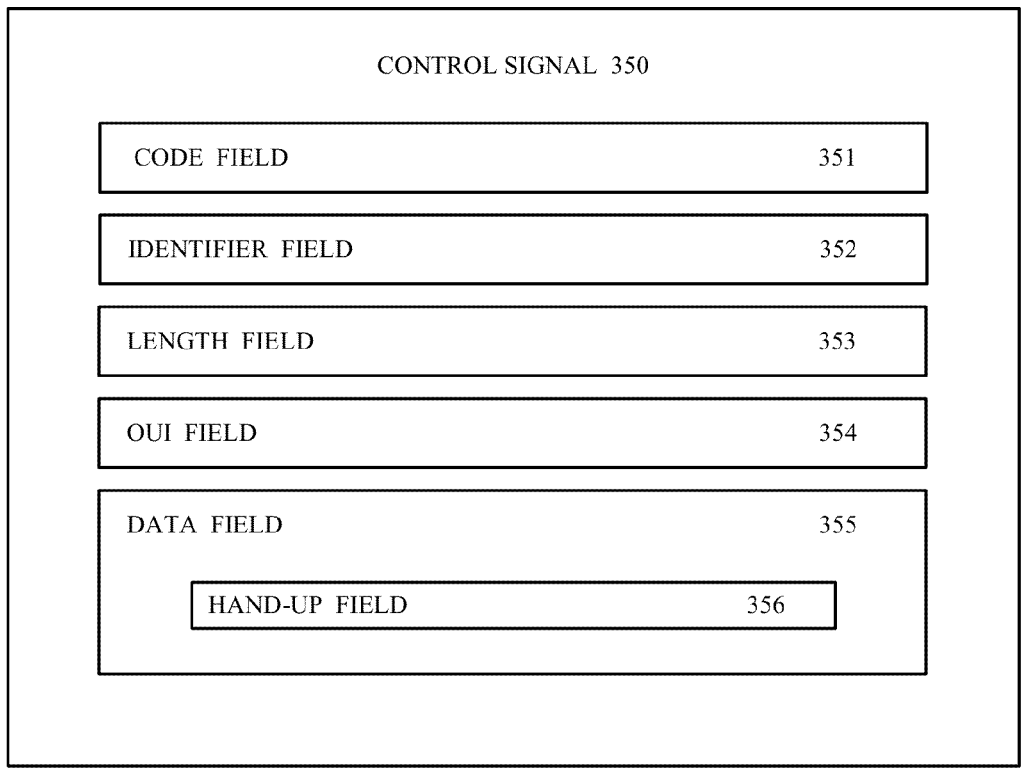
FIG. 4 shows an exemplary control signal sent from the wireless access node to the WCD.

FIG. 4 shows an exemplary control signal 350 sent from the wireless access node 110 to the WCD 100 or 200. The control signal 350 is sent to the WCD 100 or 200 in some examples when the WCD 300 first appears in the wireless coverage area 105 of the wireless access node 110. The control signal 350 may be sent by the wireless access node 110 to the WCD 100 or 200 so that the WCD 100 or 200 will be aware of the presence and particulars of the wireless access node 110. The control signal 350 includes a hand-up field 356, wherein the wireless access node 110 is programmed to include the hand-up field 356. The hand-up field 356 can be selected and generated by the wireless network vendor in some examples.

The control signal 350 can be received as part of a Point-to-Point Protocol (PPP) signaling, including as part of a Link Control Protocol (LCP) signaling. The PPP vendor extensions define a general-purpose mechanism for the negotiation of various vendor-proprietary options and extension to the kinds of control messages that may be sent via the code field 351 (see below).

The control signal 350 in this example comprises a Vendor Specific Network Control Protocol (VSNCP) control signal. The hand-up field 356 in some examples comprises a user-defined field, wherein the hand-up field 356 can comprise a hand-up TRUE state or can comprise a hand-up FALSE state. However, any suitable control signal capable of communicating a hand-up indication to the WCD 300 can be employed. In this example, the control signal 350 includes a code field 351, an identifier field 352, a length field 353, an Organizationally Unique Identifier (OUI) field 340, and a data field 355.

The code field 351 is one octet in length. The code field 351 identifies the kind of LCP packet. In this example, the code field 351 includes LCP code values for configure-request, configure-ack, configure-nack, configure-reject, terminate-request, terminate-ack, and code-reject. Where the control signal 350 includes the hand-up field 356, the code field 351 will comprise a configure-request code.

The identifier field 352 is one octet in length. The identifier field 352 aids in matching requests and replies.

The length field 353 is two octets in length. The length field indicates the length of the LCP packet (i.e., the length of the control signal 350). The length field 353 includes the length of the code field 351, the identifier field 352, the length field 353, and the data field 355.

The OUT field 354 is three octets in length. The OUT field 354 contains the organizationally unique identifier of the vendor. The vendor can comprise the entity that sponsors, provides, controls, or is otherwise involved with making available the wireless access node 110 and/or the wireless access network or networks associated with the wireless access node 110.

The data field 355 can be of any length, as defined in the length field 340. The format of the data field 355 is determined by the code field 351. The data field 355 can transport any desired information, and is determined by the vendor. The data field 355 in this example includes a hand-up field 356.

The hand-up field 356 comprises a flag, state variable, or other appropriate signal or information. The hand-up field 356 includes an indication that a hand-up is available or possible. The hand-up field 356 indicates either that a hand-up is available or unavailable.

The hand-up field 356 indicates that the wireless access node 110 features more than one communication protocol. The hand-up field 356 indicates that the WCD 300 can hand-up from a current communication protocol to another available communication protocol. The hand-up field 356 indicates that the WCD 300 can hand-up from a less-capable, current communication protocol to a more-capable communication protocol in some examples. The hand-up field 356 indicates that the WCD 300 can hand-up from a third generation (3G) cellular communication protocol to a fourth generation (4G) cellular communication protocol in some examples. The hand-up field 356 indicates that the WCD 300 can hand-up from an eHRPD communication protocol to a LTE communication protocol in some examples.

The hand-up field 356 in this example comprises a vendor-defined field within the data field 355. The hand-up field 356 is an example of the hand-up field discussed in FIG. 1. The hand-up field discussed in FIG. 1 can be the same or different from the hand-up field 356 in FIG. 4.

Referring again to FIG. 1, in some examples the less-capable communication protocol comprises a High Rate Packet Data (HRPD) or an evolved High Rate Packet Data (eHRPD) communication protocol. In addition, available 3G wireless networks can herein include Global System for Mobile communications (GSM), Universal Mobile Telecommunications System (UMTS), Code Division Multiple Access 2000 (CDMA 2000), and/or Enhanced Voice-Data Optimized (EV-DO) wireless communications protocols and wireless communication networks. The more-capable communication protocol comprises a Long Term Evolution (LTE) or Evolved Universal Terrestrial Radio Access (EUTRA) communication protocol. However, the above examples are illustrative and are not exhaustive. Other communication protocols are contemplated and are within the scope of the description and claims. Further, the communication protocols may evolve over time, and the examples above apply equally well to improvements and enhancements of current communication protocols.

Referring again to FIG. 3, the processing system 120 or 320 can comprise one or more microprocessors and other circuitry that retrieves and executes the hand-up routine 133 or 333. The processing system 120 or 320 can be implemented within a single processing device but can also be distributed across multiple processing devices or sub-systems that cooperate in executing program instructions. Examples of the processing system 120 or 320 include general purpose central processing units, application specific processors, and logic devices, as well as any other type of processing device, combinations, or variations thereof.

In some examples, the processing system 120 or 320 includes a computer readable storage media capable of storing the hand-up routine 133 or 333. The processing system 120 or 320 can include volatile and nonvolatile, removable and non-removable media implemented in any method or technology for storage of information, such as computer readable instructions, data structures, program modules, or other data.

In addition to storage media, in some implementations the processing system 120 or 320 can also include communication media over which the hand-up routine 133 or 333 can be communicated. The processing system 120 or 320 can be implemented to include a single storage device but can also be implemented to include multiple storage devices or sub-systems co-located or distributed relative to each other. The processing system 120 or 320 can comprise additional elements, such as a controller, capable of communicating with the storage media. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

The hand-up routine 133 or 333 can include additional processes, programs, or components, such as operating system software, database software, or application software. The hand-up routine 133 or 333 can also comprise firmware or some other form of machine-readable processing instructions executable by the processing system 120 or 320.

In general, the hand-up routine 133 or 333 can, when loaded into the processing system 120 or 320 and executed, transform the processing system 120 or 320 into a special-purpose computing system configured to perform a hand-up of the WCD 100 or 300, among other operations. Encoding the hand-up routine 133 or 333 on the processing system 120 or 320 can transform the physical structure of the processing system 120 or 320. The specific transformation of the physical structure can depend on various factors in different implementations of this description. Examples of such factors can include, but are not limited to the technology used to implement the storage media of the processing system 120 or 320 and whether the computer-storage media are characterized as primary or secondary storage. For example, if the computer-storage media are implemented as semiconductor-based memory, the hand-up routine 133 or 333 can transform the physical state of the semiconductor memory when the program is encoded therein. For example, the hand-up routine 133 or 333 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication device to hand-up from a High Rate Packet Data (HRPD) protocol on a wireless access node to a Long Term Evolution (LTE) protocol on the wireless access node, the method comprising:
exchanging first wireless communications for a wireless communication session with the wireless access node using the HRPD protocol;
receiving a wireless control signal from the wireless access node using the HRPD protocol and having an LTE hand-up availability flag indicating when a hand-up to the LTE protocol is available or is not available;
when the control signal indicates that a hand-up to the LTE protocol is available, then scanning for the wireless access node using the LTE protocol and exchanging second wireless communications for the wireless communication session with the wireless access node using the LTE protocol; and
when the control signal indicates that a hand-up to the LTE protocol is not available, then not scanning for the wireless access node using the LTE protocol and exchanging second wireless communications for the wireless communication session with the wireless access node using the HRPD protocol.

2. The method of claim 1 wherein the control signal comprises Link Control Protocol (LCP) signaling.

3. The method of claim 1 wherein the control signal comprises Point-to-Point Protocol (PPP) signaling.

4. The method of claim 1 wherein the control signal comprises a hand-up field that indicates that the hand-up to the LTE protocol should be attempted.

5. The method of claim 1 further comprising caching HRPD link data for the wireless access node in response to the wireless control signal indicating that the hand-up to the LTE protocol should be attempted.

6. A wireless communication device to hand-up from a High Rate Packet Data (HRPD) protocol on a wireless access node to a Long Term Evolution (LTE) protocol on the wireless access node, the wireless communication device comprising:
a communication transceiver configured to exchange first wireless communications for a wireless communication session with the wireless access node using the HRPD protocol;
the communication transceiver configured to receive a wireless control signal from the wireless access node using the HRPD protocol and having an LTE hand-up availability flag indicating when a hand-up to the LTE protocol is available or is not available;

a processing system configured to process the control signal to identify that the hand-up to the LTE protocol should be attempted;

when the control signal indicates that a hand-up to the LTE protocol is available, then the communication transceiver configured to scan for the wireless access node using the LTE protocol and to exchange second wireless communications for the wireless communication session with the wireless access node using the LTE protocol; and when the control signal indicates that a hand-up to the LTE protocol is not available, then the wireless transceiver configured to not scan for the wireless access node using the LTE protocol and exchange second wireless communications for the wireless communication session with the wireless access node using the HRPD protocol.

7. The wireless communication device of claim 6 wherein the control signal comprises Link Control Protocol (LCP) signaling.

8. The wireless communication device of claim 6 wherein the control signal comprises Point-to-Point Protocol (PPP) signaling.

9. The wireless communication device of claim 6 wherein the control signal comprises a hand-up field that indicates that the hand-up to the LTE protocol should be attempted.

10. The wireless communication device of claim 6 further comprising the processing system configured to cache HRPD link data for the wireless access node in response to the wireless control signal indicating that the hand-up to the LTE protocol should be attempted.

* * * * *